UNITED STATES PATENT OFFICE.

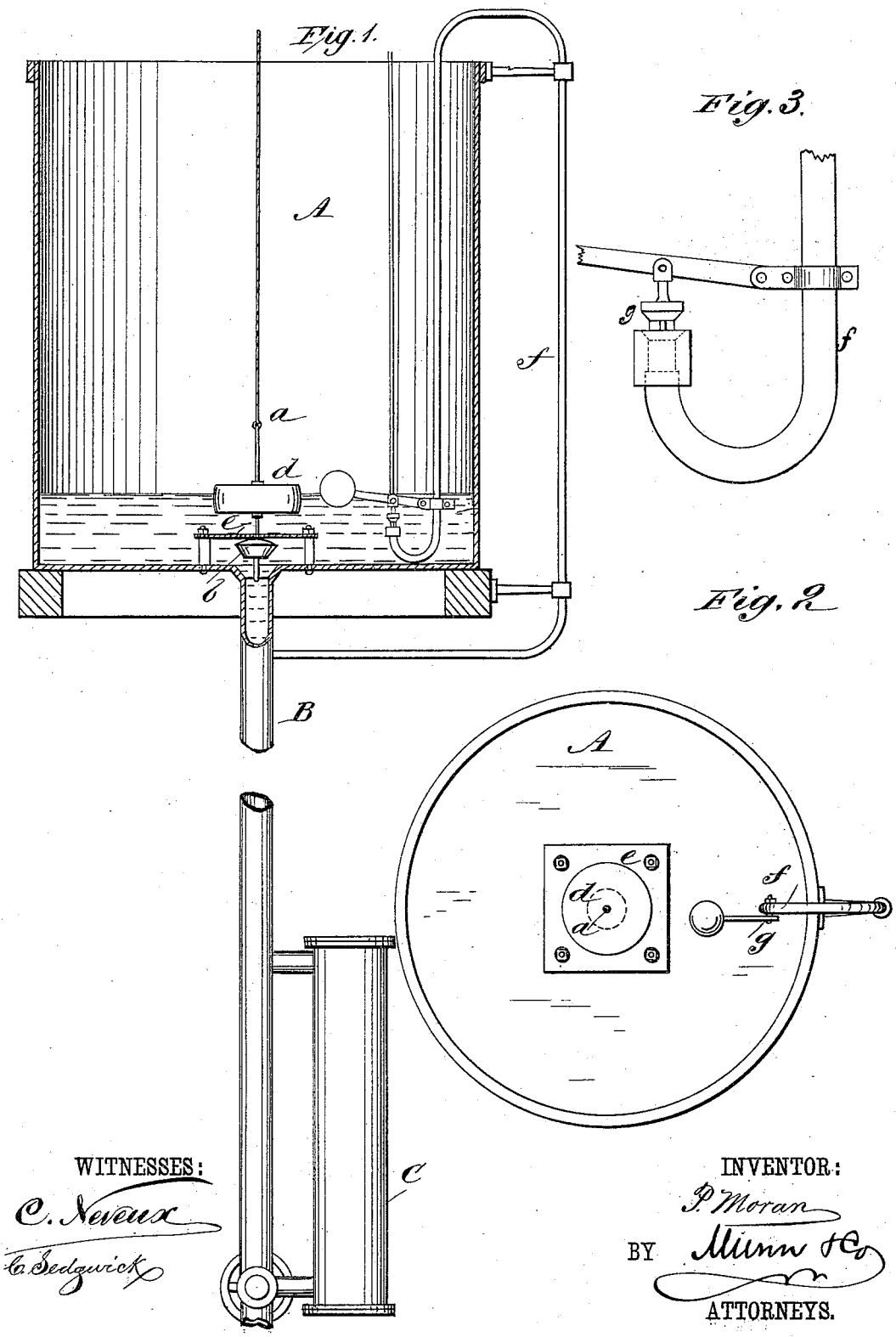

PETER MORAN, OF NEW ORLEANS, LOUISIANA.

SAFETY DEVICE FOR ELEVATORS.

SPECIFICATION forming part of Letters Patent No. 334,083, dated January 12, 1886.

Application filed December 3, 1884. Serial No. 149,395. (No model.)

*To all whom it may concern:*

Be it known that I, PETER MORAN, of New Orleans, in the parish of Orleans and State of Louisiana, have invented a new and Improved Safety Device for Elevators, of which the following is a full, clear, and exact description.

The object of my invention is to prevent the water in the tanks of hydraulic elevators from being worked so low as to empty the pipes and allow the cab or car to fall; and to that end it consists of the combinations of parts, including their construction, substantially as hereinafter fully set forth, and pointed out in the claims.

Reference is to be had to the accompanying drawings, forming part of this specification, in which similar letters of reference indicate corresponding parts in all the figures.

Figure 1 is a sectional elevation of so much of a hydraulic elevator as is necessary for understanding my invention, and Fig. 2 is a plan view of the same. Fig. 3 is an enlarged detailed view of valve or cock $g$.

A is the elevated water-tank, and B the stand-pipe supplying the cylinder C. At the center of tank A is a rod, $a$, that carries on its lower end a disk-valve, $b$, adapted to seat on the upper end of pipe B, and there is also a float, $d$, on rod $a$, for raising the rod and valve. Between the valve and the float a plate, $e$, is fixed by studs to the bottom of the tank, so as to allow proper space for the movement of the valve while relieving it of pressure.

$f$ is a siphon-pipe extending from pipe B at a point below the valve upward and down into the tank, and its lower end is provided with a cock, $g$, set low enough to open as soon as or before the water is high enough to raise float $d$. Normally the siphon $f$ is filled with water, and cock $g$ is open when the water in tank A is high enough to keep valve $b$ open. If the water falls low enough to close valve $b$, cock $g$ is likewise closed, cutting off the flow of water to pipe B and cylinder C. If in the operation of the elevator the water in tank A falls low enough to permit the closing of valve $b$ and cock $g$, this cutting off of the water-supply will naturally create a suction in the pipe B, and valve $b$ would thereby be prevented from being raised by the float as the water in tank A rises; but the float of cock $g$ will raise valve $b$, and by admitting water to the pipe B through the siphon relieve the suction on valve $b$ and permit it to be raised by its float.

Having thus described my invention, what I claim as new, and desire to secure by Letters Patent, is—

1. In a hydraulic elevator, the tank having an outlet-pipe, the safety-valve, and the float connected to said valve, and the valve arranged to open and close said outlet-pipe, in combination with a siphon, and a ball-cock arranged within said tank and connected to said siphon, the siphon being connected to the outlet-pipe, whereby suction is removed from the safety-valve to permit the ready opening of the valve as the water in the tank lifts the float, substantially as set forth.

2. In a hydraulic elevator, the combination, with the tank having the outlet-pipe, of the valve, the float connected to the valve, the siphon connected to the outlet-pipe, the ball-cock arranged in said tank and connected to the siphon, and the guide-plate for the valve-stem, substantially as and for the purpose set forth.

PETER MORAN.

Witnesses:
H. M. HYAMS,
W. M. CAMPBELL.